3,013,008
N-SUBSTITUTED 20 - AMINOPREGNAN-3-OLS, ESTERS THEREOF, AND Δ⁵-DERIVATIVES CORRESPONDING
Raymond E. Counsell, Skokie, Ill., assignor to G. D. Searle & Co., Chicago, Ill., a corporation of Delaware
No Drawing. Filed Jan. 9, 1961, Ser. No. 81,254
14 Claims. (Cl. 260—239.5)

The present invention relates to novel aminosteroids and, more particularly, to N-substituted 20-aminopregnan-3-ols, their esters, and the corresponding Δ⁵-derivatives, which can be represented by the structural formula

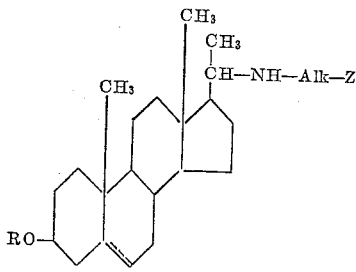

wherein R is hydrogen or a lower alkanoyl radical, Alk is a lower alkylene radical containing more than one carbon atom and separating the —NH and —Z functions by at least two carbon atoms, and Z is a member of the class comprising hydroxy and di-(lower alkyl)amino radicals, and radicals of the structural formula

wherein X is a bivalent radical selected from the group consisting of methylene, epoxy, and methylimino radicals, and $n$ is 0 or 1; and the dotted line indicates the optional presence of a doubly-bonded linkage.

The lower alkyl radicals represented supra are typified by methyl, ethyl, propyl, butyl, pentyl, hexyl, and the branched-chain isomers thereof, while the lower alkanoyl radicals include formyl, acetyl, propionyl, butyryl, valeryl, caproyl, and the branched-chain groups isomeric therewith.

The lower alkylene radicals represented by Alk are exemplified by ethylene, trimethylene, tetramethylene, pentamethylene, and their branched-chain isomers.

The instant compounds can exist in two stereoisomeric forms in consequence of the alternative α and β configurations of the substituents at carbon 20. These two isomers in each instance have been related to 20α-amino-pregn-5-en-3β-ol 3-acetate, disclosed by Corey and Hertler, Journal of the American Chemical Society, 81, 5210 (1959).

Equivalent to the instant organic bases for the purposes of this invention are the corresponding non-toxic salts as typified by the citrate, tartrate, maleate, ascorbate, gluconate, lactate, succinate, phosphate, sulfate, hydrobromide, and hydrochloride.

The process particularly suitable for the manufacture of the instant compounds of the pregnane series involves treatment of a 3β-(lower alkanoyl)oxy-5-α-pregnan-20-one with the appropriate amine and hydrogen in the presence of a hydrogenation catalyst. A specific example of this process is the reaction of 3β-acetoxy-5α-pregnan-20-one with β-dimethylaminoethylamine and hydrogen in the presence of platinum oxide catalyst to afford 20-(β-dimethylaminoethyl)amino-5α-pregnan-3β-ol 3-acetate. Hydrolysis of these esters, typically by means of aqueous sodium hydroxide, results in the corresponding 3β-ols, which can be separated by fractional crystallization to afford the individual 20α and 20β-isomers. An alternate procedure applicable to the preparation of the instant pregnane derivatives involves condensation of a 3β-(lower alkanoyl)oxy-5α-pregnan-20-one with the amine reactant to form the intermediate substituted imine, which is reduced, under suitable hydrogenation conditions, to the 20-substituted-amino derivative. For example, the aforementioned 3β-acetoxy-5α-pregnan-20-one and β-dimethylaminoethylamine are allowed to react in the presence of a catalytic quantity of p-toluenesulfonic acid to produce N-(β-dimethylaminoethyl)-3β-acetoxy - 5α - pregnan-20-imine, which is hydrogenated in the presence of platinum oxide catalyst to afford 20-(β-dimethylaminoethyl)amino-5α-pregnan-3β-ol, after hydrolysis.

The corresponding Δ⁵-derivatives encompassed by the present invention can be manufactured by a process utilizing a 20-aminopregn-5-en-3β-ol or its 3-ester as the starting material. For example, the 3β-ol 3-ester is treated with a chloro-substituted alkanoyl chloride to produce the chloroalkylamide, which is converted to the (substituted-amino)alkylamide by treatment with the appropriate amine, then to the desired 20-(substituted-aminoalkylamino) derivative by reduction with lithium aluminum hydride. This process is specifically illustrated by the acylation of 20α-aminopregn-5-en-3β-ol 3-acetate with chloroacetyl chloride to afford 20α-chloroacetamidopregn-5-en-3β-ol 3-acetate, which is treated with dimethylamine to produce 20α-dimethylaminoacetamidopregn-5-en-3β-ol 3-acetate, the reaction of which with a suitable reducing agent such as lithium aluminum hydride results in 20α-(β-dimethylaminoethyl)aminopregn-5-en-3β-ol.

When the starting material is a 3β-ol, two molecular equivalents of the chloro-substituted alkanoyl chloride are required, thus producing the bischloro-ester amide. Preferential hydrolysis of the latter substance by treatment with aqueous potassium hydroxide in dioxane affords the free 3β-ol, which is then converted to the 20-(substituted-aminoalkyl)aminopregn-5-en-3β-ol by treatment first with the substituted-aminoalkylamine, then with lithium aluminum hydride, as described supra. This procedure is exemplified by the reaction of 20β-aminopregn-5-en-3β-ol with two molecular equivalents of chloroacetyl chloride to produce 20β-chloroacetamidopregn-5-en-3β-ol 3-chloroacetate, which is partially hydrolyzed in dioxane with aqueous potassium hydroxide, resulting in 20β-chloroacetamidopregn-5-en-3β-ol, the treatment of which in butanone with dimethylamine affords 20β - dimethylaminoacetamidopregn - 5-en - 3β - ol, which is treated with lithium aluminum hydride to yield 20β-(β-dimethylaminoethyl)aminopregn-5-en-3β-ol.

The instant 20-(hydroxyalkylamino)pregn-5-en-3β-ols and corresponding 3-esters can be prepared directly from the aforementioned 20-aminopregn-5-en-3β-ols and their esters by reaction with the appropriate alkylene oxide or alkylene chlorohydrin. Typically, 20β-amino-pregn-5-en 3β-ol 3-acetate is allowed to react with ethylene chlorohydrin to yield 20-(β-hydroxyethyl)aminopregn-5-en-3β-ol 3-acetate.

The compounds of this invention are useful as a result of their valuable pharmacological properties. They are, for example, inhibitors of hepatic cholesterol synthesis, cardiac eurhythmic agents, central nervous system depressants, and appetite inhibitors.

The invention is illustrated more fully by the following examples, which are not to be construed as limiting the invention either in spirit or in scope. Temperatures are given in degrees centirgrade (°C.) and parts by weight, except as otherwise noted.

*Example 1*

To a mixture of 72.1 parts of 3β-acetoxy-5α-pregnan-20-one, 35.2 parts of β-dimethylaminoethylamine, and 48.04 parts of acetic acid is added 9.2 parts of platinum oxide and sufficient ethanol to produce a total volume of 1,000 parts. The reaction medium is stirred under hydrogen at approximately 68 atmospheres pressure and a temperature of 45° until the uptake of hydrogen ceases. The catalyst is removed by filtration, then washed with ethanol, and the filtrate is treated with a solution of 60 parts of sodium hydroxide in 200 parts of water, then heated at reflux for about 2½ hours. This mixture is cooled, concentrated to approximately ⅙ volume, then extracted with chloroform. The organic layer is washed with water, dried over anhydrous potassium carbonate, and concentrated to dryness to afford a residue, which is dissolved in acetone-ether, then treated with isopropanolic hydrogen chloride, with stirring. The resulting precipitate is collected by filtration, washed with acetone, dissolved in aqueous ethanol, and made alkaline by means of 20% aqueous sodium hydroxide. Further dilution with water effects precipitation of the crude product, which is collected by filtration and recrystallized first from acetone, then from ethyl acetate to yield a 20α-(β-dimethylaminoethyl)amino-5α-pregnan-3β-ol, M.P. about 134–136°; $[\alpha]_D = +22°$ (chloroform).

*Example 2*

The acetone and ethyl acetate mother liquors from Example 1 are concentrated to dryness, and the residue is recrystallized from heptane to yield 20β-(β-dimethylaminoethyl)amino-5α-pregnan-3β-ol, M.P. about 74–76°; $[\alpha]_D = +9°$ (chloroform).

*Example 3*

To a warm solution of one part of maleic acid in 10 parts of isopropyl alcohol is added a solution of one part of 20α-(β-dimethylaminoethyl)amino-5α-pregnan-3β-ol in 10 parts of isopropyl alcohol, and the resulting mixture is allowed to cool, then filtered to afford the dimaleate salt, M.P. about 162–164; $[\alpha]_D = +13.5°$ (methanol).

*Example 4*

An isopropanolic solution of 20β-(β-dimethylaminoethyl)amino-5α-pregnan-3β-ol is treated with maleic acid according to the procedure of Example 3 to afford the dimaleate salt, M.P. about 172–173°; $[\alpha]_D = +8°$ (methanol).

*Example 5*

A mixture of 14.42 parts of 3β-acetoxy-5α-pregnan-20-one, 10.4 parts of γ-diethylaminopropylamine, 9.6 parts of acetic acid, and 0.5 part of platinum oxide is diluted with sufficient ethanol to afford a total volume of 150 parts, then treated with hydrogen by the procedure of Example 1 to yield 20α-(γ-diethylaminopropyl)amino-5α-pregnan-3β-ol, M.P. about 120–122°; $[\alpha]_D = +3°$ (chloroform), and 20β-(γ-diethylaminopropyl)-amino-5α-pregnan-3β-ol.

*Example 6*

A mixture of 14.42 parts of 3β-acetoxy-5α-pregnan-20-one, 9.28 parts of β-diethylaminoethylamine, 9.6 parts of acetic acid, and 1.2 parts of 10% palladium-on-carbon catalyst, diluted to 165 parts by volume with ethanol, is stirred in a hydrogen atmosphere according to the process described in Example 1. Isolation of the products by the procedure of that example results in 20α-(β-diethylaminoethyl)amino-5α-pregnan-3β-ol, M.P. about 140–142°; $[\alpha]_D = +13°$. From the mother liquors is obtained the β-isomer, 20β-(β-diethylaminoethyl)amino-5α-pregnan-3β-ol.

*Example 7*

To a mixture of 14.42 parts of 3β-acetoxy-5α-pregnan-20-one, 8.16 parts of γ-dimethylaminopropylamine, and 9.6 parts of acetic acid is added 0.5 part of platinum oxide and a quantity of ethanol sufficient to achieve a reaction medium of 150 parts by volume. Treatment of this reaction mixture with hydrogen and isolation of the products by the processes described in Example 1 affords 20α-(γ-dimethylaminopropyl)amino-5α-pregnan-3β-ol and 20β-(γ-dimethylaminopropyl)amino-5α-pregnan-3β-ol.

Treatment of the α-isomer with isopropanolic hydrogen chloride affords 20α-(γ-dimethylaminopropyl)-amino-5α-pregnan-3β-ol dihydrochloride; $[\alpha]_D = +9°$ (methanol).

*Example 8*

The substitution of 9.12 parts of β-pyrrolidinoethylamine in the procedure of Example 1 results in 20α-(β-pyrrolidinoethyl)amino-5α-pregnan-3β-ol, M.P. about 145–147°; $[\alpha]_D = +18°$, and 20β-(β-pyrrolidinoethyl)-amino-5α-pregnan-3β-ol monohydrate, M.P. about 69–74°; $[\alpha]_D = +10°$.

*Example 9*

A mixture of 14.42 parts of 3β-acetoxy-5α-pregnan-20-one, 4.88 parts of β-hydroxyethylamine, 4.8 parts of acetic acid, and 0.5 part of platinum oxide containing sufficient ethanol to afford a total volume of 150 parts is allowed to react with hydrogen by the procedure of Example 1. Isolation of the crude product by the processes described in that example yields 20-(β-hydroxyethyl)amino-5α-pregnan-3β-ol, which affords 20α-(β-hydroxyethyl)amino-5α-pregnan-3β-ol, M.P. about 180–181° ($[\alpha]_D = +27.2°$) upon recrystallization from aqueous ethanol.

*Example 10*

The mother liquors from Example 9 are evaporated to dryness and the residue recrystallized from aqueous ethanol to yield 20β-(β-hydroxyethyl)amino-5α-pregnan-3β-ol, M.P. about 171–172.5°; $[\alpha]_D = +65°$.

*Example 11*

Treatment of 20-(β-hydroxyethyl)amino-5α-pregnan-3β-ol with isopropanolic hydrogen chloride followed by crystallization of the precipitate from methanol produces 20-(β-hydroxyethyl)amino-5α-pregnan-3β-ol hydrochloride hemi-methanolate, M.P. about 283–288° (dec.).

*Example 12*

20α-(β-dimethylaminoethyl)amino-5α-pregnan-3β-ol is treated with isopropanolic hydrogen chloride to afford the corresponding dihydrochloride; $[\alpha]_D = +11.5°$ (methanol).

*Example 13*

Treatment of 20β-(β-dimethylaminoethyl)amino-5α-pregnan-3β-ol with isopropanolic hydrogen chloride results in the corresponding dihydrochloride.

*Example 14*

A mixture of 14.42 parts of 3β-acetoxy-5α-pregnan-20-one, 4.88 parts of β-hydroxyethylamine, 4.8 parts of acetic acid, and 0.5 part of platinum oxide is diluted with ethanol to a volume of 150 parts, then stirred under hydrogen at a pressure of approximately 68 atmospheres and a temperature of about 45° until the uptake of gas ceases. This reaction mixture is cooled, filtered to remove the catalyst, and the filtrate is treated with isopropanolic hydrogen chloride to yield 20-(β-hydroxyethyl)amino-5α-pregnan-3β-ol 3-acetate hydrochloride, M.P. about 242–244° (dec.).

*Example 15*

A mixture of 18 parts of 3β-acetoxy-5α-pregnan-20-one, 8.8 parts of β-dimethylaminoethylamine, and 160 parts of benzene is heated at reflux, during which time the water is removed with the aid of a Dean-Stark water trap. To the mixture is then added 1.8 parts of p-toluenesulfonic acid monohydrate, and reflux is continued for about 3 hours with concomitant removal of water. The reaction mixture is cooled, washed with water, and evaporated to dryness to afford the crude product, which can be recrystallized from heptane to afford pure N-(β-dimethylaminoethyl)-3β-acetoxy-5α-pregnan-20-imine, M.P. 102–104°; $[\alpha]_D = +37°$.

To a solution of the latter crude imine in 200 parts of purified dioxane is added 1.8 parts of platinum oxide, and this mixture is hydrogenated at room temperature and 4 atmospheres pressure until the absorption of hydrogen ceases. The catalyst is removed by filtration and washed with dioxane, and the filtrate is concentrated to about ¼ volume, then diluted with ether. This organic solution is washed with water, dried over anhydrous potassium carbonate containing decolorizing carbon, and concentrated to dryness in vacuo to afford an oily residue. A solution of this residue in 160 parts of methanol is treated with a solution of 4 parts of sodium hydroxide in 20 parts of water, and the resulting mixture is heated at reflux for about 2 hours, then stored at room temperature for about 15 hours, and poured slowly into ice water. This aqueous mixture is extracted with methylene chloride, and the organic layer is dried over anhydrous sodium sulfate, then evaporated to dryness to yield a residue, which is dissolved in acetone and treated with isopropanolic hydrogen chloride. The resulting precipitate is collected by filtration, washed with ether, and dried to produce 20-(β-dimethylaminoethyl)-amino-5α - pregnan - 3β-ol dihydrochloride.

A solution of the latter dihydrochloride in aqueous ethanol is made alkaline by the addition of aqueous sodium hydroxide, then poured slowly, with stirring, into ice water. The resulting precipitate is collected by filtration, washed with water, and fractionally crystallized from ethyl acetate to afford 20α-(β-dimethylaminoethyl)amino-5α-pregnan-3β-ol, identical with the product of Example 1, and 20β-(β-dimethylaminoethyl)amino - 5α-pregnan-3β-ol, identical with the product of Example 2.

Example 16

To a solution of 18 parts of 20α-aminopregn-5-en-3β-ol 3-acetate in 240 parts of benzene containing 7.3 parts of triethylamine is added dropwise a solution of 7.5 parts of chloroacetyl chloride in 20 parts of benzene, and this mixture is stirred and heated at reflux for about one hour, then cooled and filtered. The filter cake is washed with benzene, and the filtrate is washed successively with dilute hydrochloric acid, aqueous sodium bicarbonate, and water, dried over anhydrous sodium sulfate containing decolorizing carbon, and stripped of solvent at reduced pressure. The residue is crystallized from ethanol to yield 20α-chloroacetamidopregn - 5 - en-3β-ol 3-acetate, M.P. about 196–199°; $[\alpha]_D = -44°$.

Example 17

To a solution of 8.72 parts of 20α-chloroacetamidopregn-5-en-3β-ol 3-acetate in 87 parts of toluene containing 20 parts of butanone is added a solution of 9 parts of dimethylamine in 26 parts of toluene, and this mixture is heated at 50–55° in a suitable sealed container for about 40 hours. The reaction mixture is cooled, washed with water, dried over anhydrous potassium carbonate containing decolorizing carbon, and evaporated to dryness at reduced pressure. The resulting residue is crystallized from heptane to produce 20α-dimethylaminoacetamidopregn-5-en-3β-ol 3-acetate, M.P. about 159.5–161.5°; $[\alpha]_D = 52.5°$.

To a slurry of 3.8 parts of lithium aluminum hydride in 75 parts of purified dioxane is added, with stirring a solution of 8.8 parts of 20α-dimethylaminoacetamidopregn-5-en-3β-ol 3-acetate in 100 parts of purified dioxane, and the reaction mixture is heated at reflux with stirring for about 18 hours, then cooled to 0–5°, and treated successively with 50 parts of dioxane containing 4 parts of water, 3 parts of 20% aqueous sodium hydroxide, and 14 parts of water. The resulting precipitated salts are removed by filtration, and the filtrate is poured slowly into ice water to effect precipitation of the crude product, which is collected by filtration and recrystallized from acetone-hexane to yield pure 20α-(β-dimethylaminoethyl)aminopregn - 5 - en - 3β - ol, M.P. about 83–87°; $[\alpha]_D = 41°$.

Example 18

To a solution of 0.5 part of 20α-(β-dimethylaminoethyl)aminopregn-5-en-3β-ol in 10 parts of ethanol is added 0.25 part of concentrated hydrochloric acid and 0.1 part of platinum oxide, and the reaction mixture is stirred in a hydrogen atmosphere until hydrogen absorption ceases. The catalyst is removed by filtration and washed with ethanol, and the filtrate is concentrated to dryness to afford a residue, which yields 20α-(β-dimethylaminoethyl)amino-5α-pregnan-3β-ol dihydrochloride upon crystallization from aqueous ethanol. This product is identical with that described in Example 12.

A solution of the latter dihydrochloride in aqueous methanol is made alkaline with 20% aqueous sodium hydroxide, and the resulting precipitate is collected by filtration, washed with water, and recrystallized from ethyl acetate to afford 20α-(β-dimethylaminoethyl)amino-5α-pregnan-3β-ol, identical with the product of Example 1.

Example 19

Treatment of 20α - (β - diethylaminoethyl)amino - 5α-pregnan-3β-ol with isopropanolic hydrogen chloride and recrystallization of the crude product from methanol-ethyl acetate affords the corresponding dihydrochloride, M.P. about 250–260° (dec.).

Example 20

The reaction of 3 parts of 20α-(β-dimethylaminoethyl)aminopregn-5-en-3β-ol with 3 parts of maleic acid in 50 parts of isopropanol yields the corresponding dimaleate, which is recrystallized from acetone-methanol to afford the pure material, M.P. about 173–174°.

Example 21

The substitution of 15.9 parts of 20β-amino-pregn-5-en-3β-ol and 16.9 parts of β-chloropropionyl chloride in the process of Example 16 results in 20β-(β-chloropropionamido)pregn-5-en-3β-ol 3-(β-chloropropionate).

Example 22

To a solution of 49.8 parts of 20β-(β-chloropropionamido)pregn-5-en-3β-ol 3-(β-chloropropionate) in 250 parts of dioxane is added 6 parts of potassium hydroxide and 2 parts of water, and the mixture is stored at room temperature for about 16 hours, then extracted with ether. The organic layer is washed with water, dried over anhydrous sodium sulfate, and stripped of solvent at reduced pressure. The residue is crystallized from ethyl acetate to produce 20β-(β-chloropropionamido)-pregn-5-en-3β-ol.

Example 23

The reaction of 8.1 parts of 20β-(β-chloropropionamido)pregn-5-en-3β-ol with 14.6 parts of diethylamine according to the procedure of Example 17 results in 20β-(β-diethylaminopropionamido)pregn-5-en-3β-ol, 8.8 parts of which is treated with lithiumaluminum hydride by the process described in that example to yield 20β-(γ-diethylaminopropyl)aminopregn-5-en-3β-ol.

Example 24

A solution of 9 parts of 20α-chloroacetamidopregn-5-en-3β-ol 3-acetate and 4.4 parts of diethylamine in 154 parts of benzene is heated at 50–55° in a suitable sealed container for about 48 hours. The cooled mixture is filtered, and the filtrate is evaporated to dryness in vacuo. Crystallization of the solid residue from aqueous methanol affords 20α-diethylaminoacetamidopregn-5-en-3β-ol 3-acetate, M.P. about 147–149°.

Example 25

To a refluxing slurry of 3.5 parts of lithium aluminum hydride in 100 parts of purified dioxane, under nitrogen, is added 6.9 parts of 20α-diethylaminoacetamidopregn-5-en-3β-ol 3-acetate dissolved in 75 parts of purified dioxane over a period of about 1½ hours. Reflux is contained for about 20 hours, and the reaction mixture is cooled to about 0–5°, then treated successively with 2.5 parts of dioxane containing 3.5 parts of water, 2.63 parts of 20% aqueous sodium hydroxide, and 11.9 parts of water. The precipitated salts are removed by filtration, and the filtrate is stripped of solvent at reduced pressure to afford a residue, which is crystallized from acetone to yield pure 20α-(β-diethylaminoethyl)aminopregn-5-en-3β-ol, M.P. about 130–132°.

*Example 26*

A solution of 4.4 parts of 20α-chloroacetamido-pregn-5-en-3β-ol 3-acetate and 1.7 parts of pyrrolidine in 44 parts of benzene is heated at reflux for about 20 hours, then allowed to cool to room temperatures and diluted with ether. The organic mixture is washed with water, dried over anhydrous potassium carbonate containing decolorizing carbon, and evaporated to dryness in vacuo. The resulting crystalline residue is recrystallized from aqueous ethanol to yield pure 20α-pyrrolidinoacetamido-pregn-5-en-3β-ol 3-acetate, M.P. about 157–160°.

*Example 27*

The process of Example 25 is used to convert 20α-pyrrolidinoacetamidopregn-5-en-3β-ol 3-acetate to 20α-(β-pyrrolidinoethyl)aminopregn-5-en-3β-ol, M.P. about 111–113.5°.

*Example 28*

The reaction of 20α-(β-pyrrolidinoethyl)aminopregn-5-en-3β-ol with maleic acid by the procedure of Example 3, and recrystallization of the crude salt from acetone-methanol results in the corresponding pure dimaleate, M.P. about 164–167°.

*Example 29*

An equivalent quantity of piperidine is substituted in the procedure of Example 26 to produce a material, which is recrystallized from methanol to afford 20α-piperidinoacetamidopregn-5-en-3β-ol 3-acetate, M.P. about 171.5–172.5°.

*Example 30*

The substitution of an equivalent quantity of 20α-piperidinoacetamidopregn-5-en-3β-ol 3-acetate in the process described in Example 25 results in 20α-(β-piperidinoethyl)aminopregn-5-en-3β-ol, M.P. about 142–143.5°.

*Example 31*

By substituting an equivalent quantity of morpholine and otherwise proceeding according to the herein described processes of Example 26, 20α-morpholinoacetamidopregn-5-en-3β-ol 3-acetate, M.P. about 173–176°, is obtained.

*Example 32*

The reaction of an equivalent quantity of 20α-morpholinoacetamidopregn-5-en-3β-ol 3-acetate with lithium aluminum hydride by the process described in Example 25 affords 20α-(β-morpholinoethyl)aminopregn-5-en-3β-ol, M.P. about 145.5–147°.

*Example 33*

20α-(β-morpholinoethyl)aminopregn-5-en-3β-ol is allowed to react with maleic acid according to the procedure of Example 3 to yield the dimaleate, M.P. about 135–138°.

*Example 34*

The substitution of an equivalent quantity of N-methylpiperazine in the procedure of Example 26 results in 20α-[(N-methylpiperazino)acetamido]pregn-5-en-3β-ol 3-acetate, obtained as an oil.

*Example 35*

An equivalent quantity of 20α-[(N-methylpiperazino)-acetamido]pregn-5-en-3β-ol 3-acetate is substituted in the procedure of Example 25 to yield 20α-[β-(N-methylpiperazinoethyl)amino]pregn-5-en-3β-ol, M.P. about 147–148°.

*Example 36*

The substitution of an equivalent quantity of 3β-propionoxy-5α-pregnan-20-one in the process of Example 14 results in 20-(β-hydroxyethyl)amino-5α-pregnan-3β-ol 3-propionate.

What is claimed is:
1. A compound of the structural formula

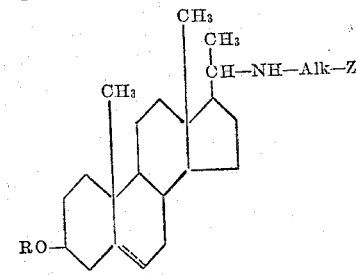

wherein R is selected from the group consisting of hydrogen and lower alkanoyl radicals, Alk is a lower alkylene radical containing more than one carbon atom and separating the —NH and —Z functions by at least two carbon atoms, Z is selected from the group consisting of hydroxy and di-(lower alkyl)amino radicals and radicals of the structural formula

wherein X is selected from the group consisting of methylene, epoxy, and methylimino radicals and n is selected from the group consisting of 0 and 1, and the dotted line indicates the optional presence of a doubly-bonded linkage between carbon atoms 5 and 6.

2. A compound of the structural formula

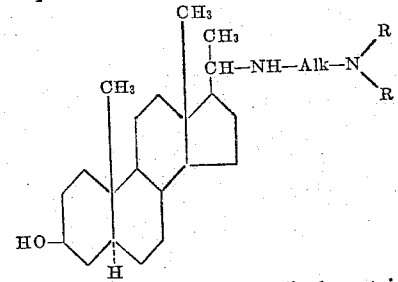

wherein Alk is a lower alkylene radical containing more than one carbon atom and separating the —NH and

functions by at least two carbon atoms, and R is a lower alkyl radical.

3. A compound of the structural formula

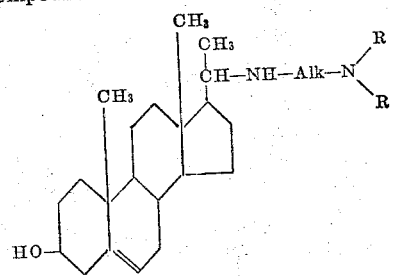

wherein Alk is a lower alkylene radical containing more than one carbon atom and separating the —NH and

functions by at least two carbon atoms, and R is a lower alkyl radical.

4. 20-(γ-diethylaminopropyl)-amino-5α-pregnan-3β-ol.
5. 20-(β-diethylaminoethyl)amino-5α-pregnan-3β-ol.
6. 20-(β-hydroxyethyl)amino-5α-pregnan-3β-ol.
7. 20-(β-pyrrolidinoethyl)amino-5α-pregnan-3β-ol.
8. 20-(β-dimethylaminoethyl)amino-5α-pregnan-3β-ol.
9. 20-(β-dimethylaminoethyl)aminopregn-5-en-3β-ol.
10. 20-(β-diethylaminoethyl)aminopregn-5-en-3β-ol.
11. 20-(β-pyrrolidinoethyl)aminopregn-5-en-3β-ol.
12. 20-(β-piperidinoethyl)aminopregn-5-en-3β-ol.
13. 20-(β-morpholinoethyl)aminopregn-5-en-3β-ol.
14. 20-[β-(N-methylpiperazinoethyl)amino]-pregn-5-en-3β-ol.

References Cited in the file of this patent
UNITED STATES PATENTS 2,697,107 Ruschig et al. _____ Dec. 14, 1954
2,846,432 Nysted _____ Aug. 5, 1958

OTHER REFERENCES

Corey et al.: J. Am. Chem. Soc., vol. 80, 2903 (1958).